United States Patent
Moonier et al.

(10) Patent No.: US 7,600,159 B1
(45) Date of Patent: Oct. 6, 2009

(54) SYSTEM AND METHOD OF PROVIDING NOTIFICATIONS RELATED TO DIAGNOSTIC INFORMATION

(75) Inventors: Tracy Moonier, Corinth, TX (US); John McCloskey, Kensington, MD (US)

(73) Assignee: Nextel Communications Inc., Reston, VA (US)

( * ) Notice: Subject to any disclaimer, the term of this patent is extended or adjusted under 35 U.S.C. 154(b) by 406 days.

(21) Appl. No.: 11/637,168

(22) Filed: Dec. 12, 2006

(51) Int. Cl.
*G06F 11/00* (2006.01)

(52) U.S. Cl. .......................... 714/48; 714/57
(58) Field of Classification Search ............ 714/48, 714/57
See application file for complete search history.

(56) References Cited

U.S. PATENT DOCUMENTS

| | | | | |
|---|---|---|---|---|
| 6,145,101 A * | 11/2000 | Pike | ............ | 714/46 |
| 6,263,055 B1 | 7/2001 | Garland et al. | | |
| 6,411,678 B1 * | 6/2002 | Tomlinson et al. | ......... | 379/1.01 |
| 6,510,212 B2 | 1/2003 | Ito et al. | | |
| 6,697,962 B1 * | 2/2004 | McCrory et al. | ............ | 714/27 |
| 6,993,675 B2 * | 1/2006 | Roddy et al. | ............ | 714/2 |
| 7,000,849 B2 | 2/2006 | Ashworth et al. | | |
| 7,080,285 B2 * | 7/2006 | Kosugi et al. | ............ | 714/36 |
| 7,111,205 B1 * | 9/2006 | Jahn et al. | ............ | 714/47 |
| 7,149,936 B2 * | 12/2006 | Deshpande et al. | ........ | 714/57 |
| 7,269,761 B2 * | 9/2007 | Yi | ............ | 714/46 |
| 2002/0007304 A1 | 1/2002 | Kasajima et al. | | |
| 2003/0136135 A1 * | 7/2003 | Kim et al. | ............ | 62/125 |
| 2004/0205397 A1 * | 10/2004 | Rajiv et al. | ............ | 714/25 |
| 2006/0047415 A1 | 3/2006 | Groskreutz et al. | | |

* cited by examiner

*Primary Examiner*—Marc Duncan

(57) ABSTRACT

Systems and methods for providing notices related to diagnostic information are provided. Diagnostic information related to a monitored device is provided to database. When it is determined that the diagnostic information indicates that service-related information should be provided to a communication station, such information is transmitted to the communication station. This information can identify one or more service providers that can address issues related to the diagnostic information.

18 Claims, 4 Drawing Sheets

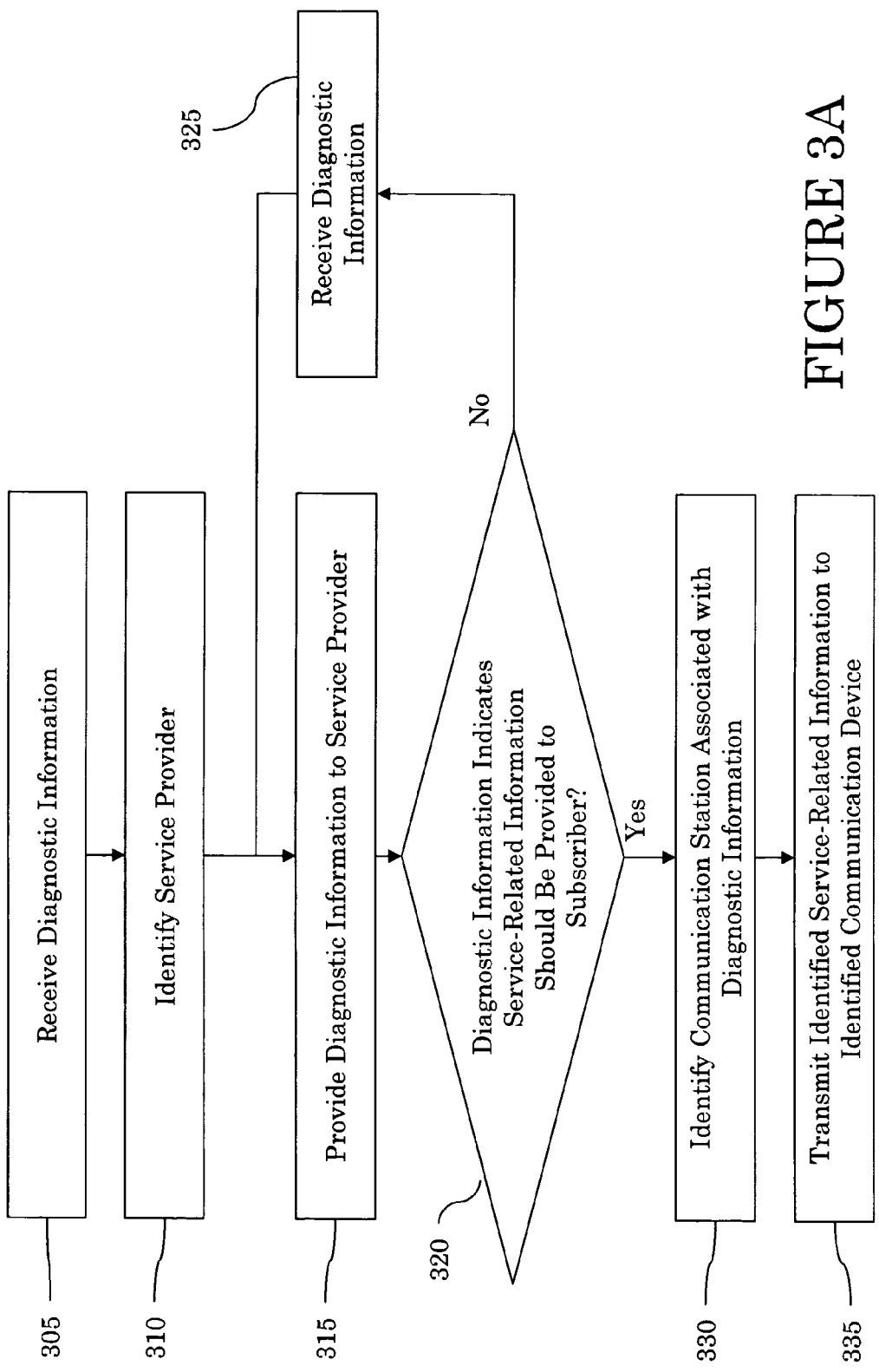

SYSTEM AND METHOD OF PROVIDING NOTIFICATIONS RELATED TO DIAGNOSTIC INFORMATION

BACKGROUND OF THE INVENTION

The rapid development of technology has resulted in devices becoming more and more complex. This complexity increases the number of points of failure in the devices, and the difficulty in identifying the particular point of failure. Some devices, such as automotive control computers, include an interface for analyzing operation of the device. This interface allows the device to provide an identification, typically by using a diagnostic code, of a point of failure. The interface is typically a hard-wired interface that requires the device to be analyzed and the analysis device to be located in the same general geographical area.

Telemetry is one technique that is used by utility operators to remotely monitor utility meters. Telemetry allows utility operators to save time and money by obtaining usage information without requiring a "meter reader" to visit the location of the utility meter to manually read the utility meter. Conventional telemetry systems were focused on reducing the burden on utility operators and did not consider interaction with the utility subscriber.

SUMMARY OF THE INVENTION

Exemplary embodiments of the present invention provide systems and methods for providing notifications related to diagnostic information of a monitored device. The diagnostic information is provided to a database over one or more communication networks. The diagnostic information can be provided to one or more service providers after they are received, regardless of whether the diagnostic information indicates a need for service. The diagnostic information can also be provided to one or more service providers once the diagnostic information indicates a need for service. When the diagnostic information indicates a need for service, a notification is sent to a communication station associated with the monitored device. The notification can identify one or more service providers that can service the monitored device.

Other objects, advantages and novel features of the present invention will become apparent from the following detailed description of the invention when considered in conjunction with the accompanying drawings.

BRIEF DESCRIPTION OF THE DRAWING FIGURES

FIGS. 3A and 3B are flow diagrams illustrating exemplary methods for providing notifications related to diagnostic information in accordance with the present invention.

DETAILED DESCRIPTION OF THE PREFERRED EMBODIMENTS

Figure 1:
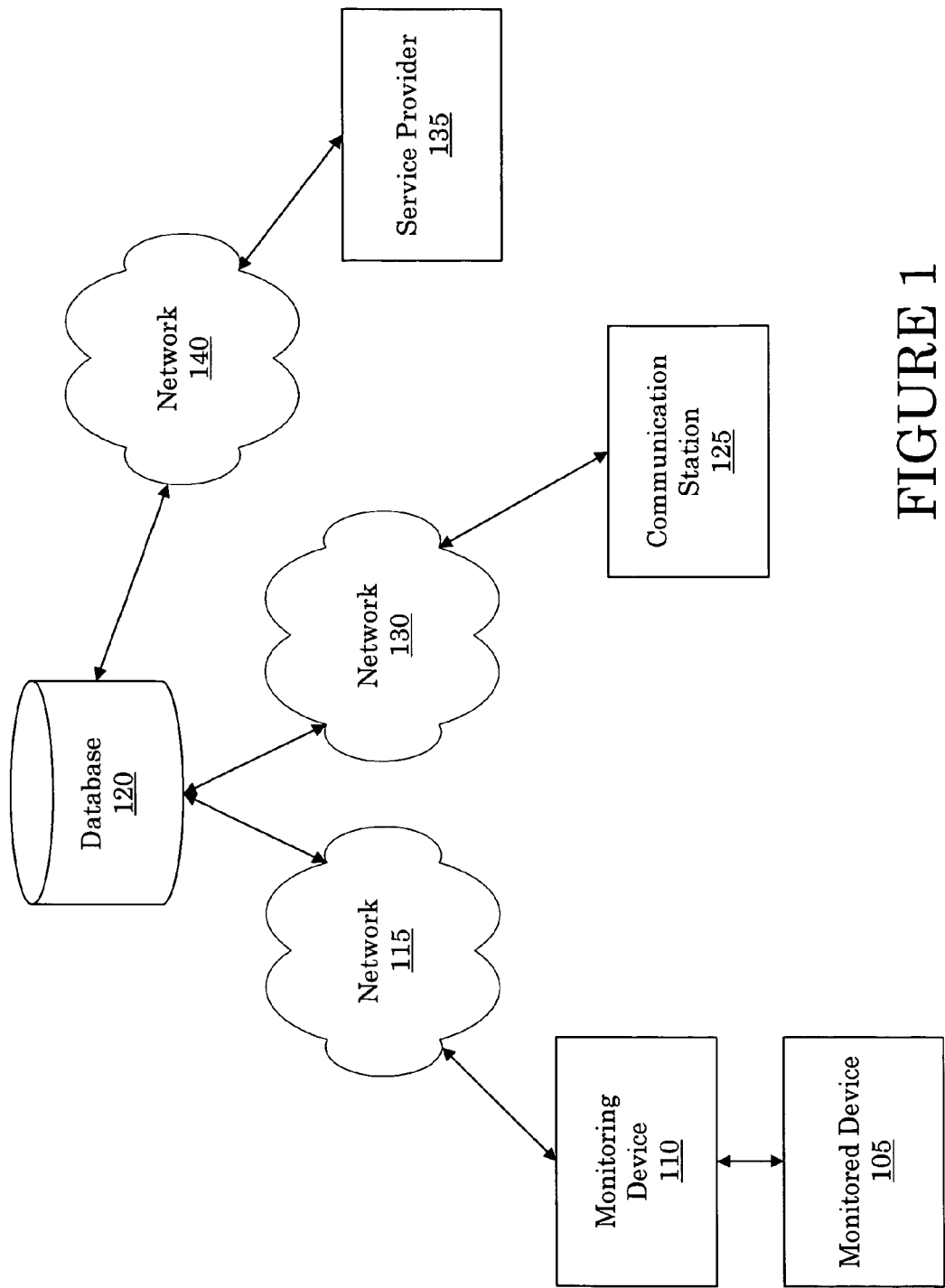
FIG. 1 is a block diagram illustrating an exemplary system for providing notifications related to diagnostic information in accordance with the present invention.

FIG. 1 is a block diagram illustrating an exemplary system for providing notifications related to diagnostic information in accordance with the present invention. The system includes a monitored device 105 that is coupled to monitoring device 110. Monitoring device 110 is coupled via communication network 115 to database 120. The system also includes communication station 125 coupled to database 120 via communication network 130, and service provider 135 coupled to database 120 via communication network 140.

As will be described in more detail below, monitoring device 110 provides diagnostic information to database 120, and database 120 can provide the diagnostic or other information to service provider 135. Database 120 can translate the diagnostic information into a form useable by the service provider, if necessary. The diagnostic information can be standardized providing similar diagnostic information across all types of monitored devices, or can be different for different monitored devices. The standardized diagnostic information can indicate, for example, that service is required without specifically identifying the cause of the service, whereas different diagnostic information can identify the cause of the service.

Database 120 can also provide service-related information to communication station 125, which is associated with monitored device 105 and monitoring device 110 in a record of database 120. The service-related information can include identification of one or more service providers, and can include incentives (e.g., a coupon) for selecting service from a particular service provider.

Although illustrated as separate elements, monitored device 105 and monitoring device 110 can be components of the same device. Monitored device 105 can be any type of device including, but not limited to, a consumer electronic device (e.g., DVD player, VCR), a medical device (e.g., a heart monitor, diabetes monitor), a utility device (e.g., a hot-water heater, furnace, air conditioner, or controller of these devices), and/or the like. Additionally, a single monitoring device 110 can be coupled to a number of monitored devices.

Communication station 125 operates independently of monitored device 105, and can be a fixed or mobile communication station. Service provider 135 can be any type of service provider for monitored device 105. Communication networks 115, 130 and 140 can be the same or different communication networks, and can each include more than one type of communication network, including, but not limited to, Ethernet, Insteon, Zigbee, Z-Wave, X-10, Wi-Fi, WiMAX, ATM, CDMA, GSM, iDEN and/or the like. For example, when communication station 125 is a wireless mobile station, network 130 can include a wireless network (such as a short-range wireless network and/or a wide area wireless network) and a wired network (e.g., a public switched telephone network (PSTN)).

Figure 2:
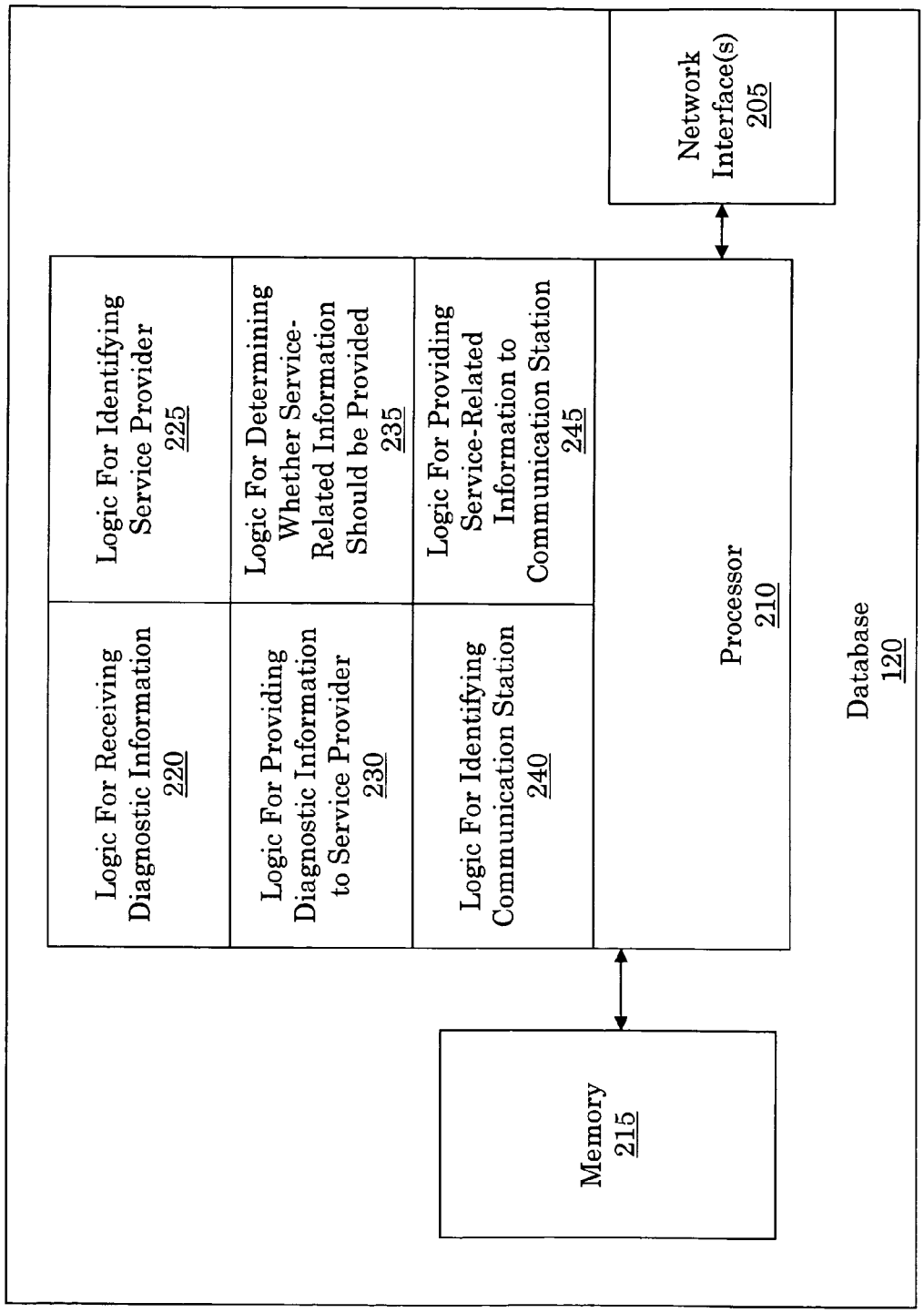
FIG. 2 is a block diagram illustrating an exemplary device for providing notifications related to diagnostic information in accordance with the present invention.

FIG. 2 is a block diagram illustrating an exemplary database 120 for providing notifications related to diagnostic information in accordance with the present invention. Database 120 includes one or more network interfaces 205 for interfacing with networks 115, 130, 140. Network interface 205 is coupled to processor 210, which in turn is coupled to memory 215. Memory 215 can be any type of memory, including random access memory, read-only memory, flash memory, a hard disk, and/or the like. Processor 210 includes logic 220-245, which will be described in more detail below in connection with FIGS. 3A and 3B. Processor 210 can be a microprocessor, application specific integrated circuit (ASIC), field programmable gate array (FPGA), and/or the like. When processor 210 is a microprocessor logic 220-245 can be processor-executable code loaded from memory 215.

Figure 3B:
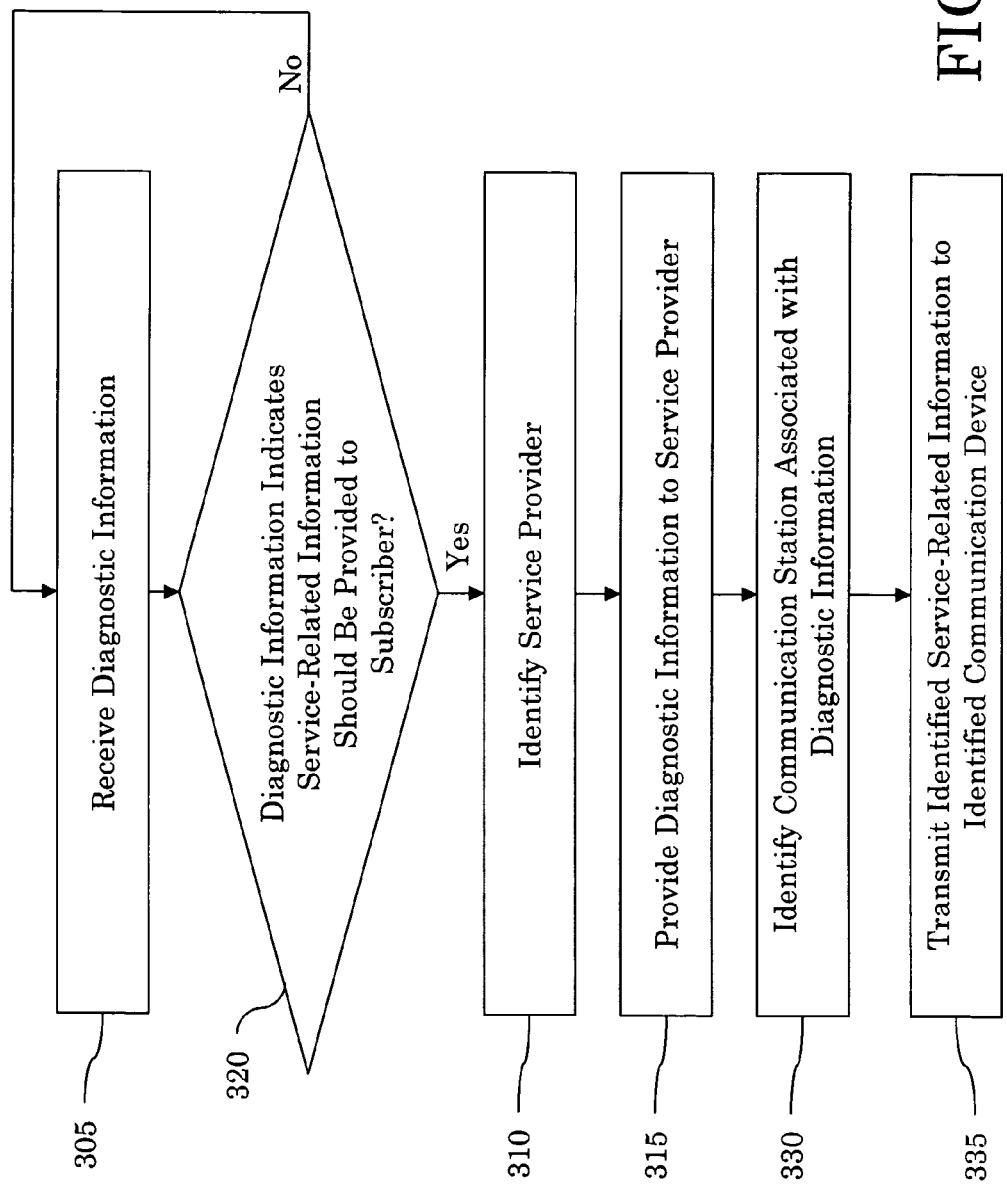

FIGS. 3A and 3B are flow diagrams illustrating exemplary methods for providing notifications related to diagnostic information in accordance with the present invention. Referring to FIG. 3A, monitoring device 110 periodically provides diagnostic information to database 120 via network 115. Database 120 receives the diagnostic information over network interface 205, which provides it to logic 220 (step 305). Logic 225 then identifies a service provider for the diagnostic information and logic 230 provides the diagnostic information to service provider 135 over network interface 205 (steps 310 and 315). The diagnostic information can be provided to more than one service provider, if desired. Selection of a service provider can be based on a number of factors, including geographical proximity to the monitored device, type of monitored device, ratings for the service provider (e.g., based on consumer ratings or the like), amount of compensation paid by service providers to the operator of database 120 and/or the like.

Logic 235 analyzes the diagnostic information and determines whether the diagnostic information indicates that service-related information should be provided to the subscriber (step 320). The diagnostic information can indicate that service-related information should be provided to the subscriber when the diagnostic information indicates a failure of the monitored device, an impending failure of the monitored device, degradation in the operation of the monitored device below a preset level, and/or routine service is required or recommended for the monitored device.

When the information should not be provided ("No" path out of decision step 320), then logic 220 continues to receive diagnostic information and logic 230 continues to provide such information to the identified service provider (steps 325 and 315).

When the information indicates that service-related information should be provided to the subscriber ("Yes" path out of decision step 320), then logic 240 identifies one or more communication stations associated with the diagnostic information (step 330) and logic 245 transmits the service-related information to the identified communication station (step 335). The identification of a communication station associated with the diagnostic information can be based on a database lookup. For example, a person can subscribe to notifications for one or more monitored devices, and the subscription information can be stored in database 120. The subscription can be for more than one communication device, if desired. The service-related information can be provided in any number of different forms (e.g., voice, video, text, rich text, HTML and/or the like), which can be dependent on the type of communication station that is to receive the information.

FIG. 3B is similar to FIG. 3A, except that the service provider is not identified (step 310) and the diagnostic information is not provided to the service provider (step 315) until it has been determined that service-related information should be provided to the subscriber ("Yes" path out of decision step 320). Again, more than one service provider can be identified and provided with the diagnostic information. Another alternative is to omit notification of the service provider altogether. Yet another alternative is that diagnostic information is only provided to database 120 upon determination by monitoring device 110 that service-related information should be provided communication station 125.

Although exemplary embodiments have been described with database 120 determining whether service-related information should be provided to a communication station, this determination can be performed by a service provider. Moreover, although exemplary embodiments have been described as providing service-related information to a communication station based on receipt of diagnostic information, the service-related information can be provided independent of the diagnostic information as a form of targeted advertising.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing notices related to diagnostic information, the method comprising the acts of:
    receiving diagnostic information from a monitoring device;
    determining that service-related information should be provided to a communication device; and
    transmitting the service related information to the communication device,
    wherein the communication device operates independently of the monitoring device,
    wherein the service-related information includes an incentive for services.

2. The method of claim 1, wherein the service-related information identifies a service provider, the method further comprising the acts of:
    transmitting the diagnostic information to the service provider.

3. The method of claim 1, wherein the service-related information identifies a service provider, the method further comprising the act of:
    transmitting the diagnostic information to the identified service provider only when it is determined that the service-related information should be provided to the communication device.

4. The method of claim 1, wherein the diagnostic information is provided to a service provider when it is received from the monitoring device.

5. The method of claim 1, wherein the service-related information identifies one or more service providers.

6. The method of claim 1, wherein the monitoring device is an electrical appliance and the communication device is a wireless telephone.

7. A database for providing notices related to diagnostic information, the database comprising:
    a memory; and
    a processor coupled to the memory, the processor comprising
    logic for receiving diagnostic information from a monitoring device;
    logic for determining that service-related information should be provided to a communication device; and
    logic for transmitting the service related information to the communication device, wherein the communication device operates independently of the monitoring device,
    wherein the service-related information includes an incentive for services.

8. The database of claim 7, wherein the service-related information identifies a service provider, the processor further comprising:
    logic for transmitting the diagnostic information to the service provider.

9. The database of claim 7, wherein the service-related information identifies a service, the processor further comprising:
    logic for transmitting the received diagnostic information to the service provider only when it is determined that service-related information should be provided to the communication device.

10. The database of claim 7, wherein the diagnostic information is provided to a service provider when it is received from the monitoring device.

11. The database of claim 7, wherein the service-related information identifies one or more service providers.

12. The database of claim 7, wherein the monitoring device is an electrical appliance and the communication device is a wireless telephone.

13. The database of claim 7, wherein the diagnostic information is received over a first communication network and the service related information is transmitted over a second communication network.

14. A system for providing notices related to diagnostic information, the system comprising:
- a monitoring device;
- a communication device; and
- a database coupled to the monitoring and communication devices, the database including a memory; and
- a processor, the processor comprising logic for receiving diagnostic information from the monitoring device;
- logic for determining that service-related information should be provided to the communication device; and
- logic for transmitting the service related information to the communication device, wherein the communication device operates independently of the monitoring device, wherein the service-related information includes an incentive for services.

15. The system of claim 14, further comprising:
- a monitored device, wherein diagnostic information is provided by the monitored device to the monitoring device using a short-range wireless communication link.

16. The system of claim 14, wherein the communication device is a wireless communication device.

17. The system of claim 14, further comprising:
- a service provider, wherein the service provider is identified in the service related information.

18. The system of claim 17, wherein the database is coupled to the monitoring device by a first communication network, to the communication device by a second communication network and to the service provider by a third communication network.

* * * * *